(12) United States Patent
Matevossian

(10) Patent No.: US 12,510,180 B2
(45) Date of Patent: Dec. 30, 2025

(54) THERMALLY ACTIVATABLE VALVE

(71) Applicant: AEROJET ROCKETDYNE, INC., Melbourne, FL (US)

(72) Inventor: Robert Matevossian, Tarzana, CA (US)

(73) Assignee: AEROJET ROCKETDYNE, INC., Melbourne, FL (US)

( * ) Notice: Subject to any disclaimer, the term of this patent is extended or adjusted under 35 U.S.C. 154(b) by 99 days.

(21) Appl. No.: 18/544,848

(22) Filed: Dec. 19, 2023

(65) Prior Publication Data

US 2025/0198531 A1 Jun. 19, 2025

(51) Int. Cl.
F16K 31/02 (2006.01)
F16K 17/38 (2006.01)
F16K 31/00 (2006.01)

(52) U.S. Cl.
CPC .......... F16K 31/025 (2013.01); F16K 17/383 (2013.01); F16K 31/002 (2013.01)

(58) Field of Classification Search
CPC ..... F16K 31/025; F16K 31/002; F16K 17/383
See application file for complete search history.

(56) References Cited

U.S. PATENT DOCUMENTS

| | | | | |
|---|---|---|---|---|
| 3,861,473 A * | 1/1975 | Livingston | ............. | A62C 37/10 236/100 |
| 4,156,518 A * | 5/1979 | Ludwig | ................. | F16K 31/025 236/101 E |
| 4,744,383 A * | 5/1988 | Visnic | .................. | F16K 17/383 137/72 |
| 4,922,944 A * | 5/1990 | Mueller | ................. | F16K 17/383 137/72 |
| 5,511,576 A * | 4/1996 | Borland | ................. | F16K 17/383 137/72 |
| 7,748,405 B2 * | 7/2010 | Ghorbal | ................. | G05D 23/08 251/336 |
| 8,499,779 B2 * | 8/2013 | Gillespie | .................. | F16K 27/00 137/68.13 |
| 11,467,610 B2 * | 10/2022 | Quevallier | ........... | G05D 23/022 |
| 11,754,057 B2 * | 9/2023 | Citro | .................... | F03G 7/06143 251/11 |
| 2003/0217770 A1 * | 11/2003 | Schultz | ................. | F16K 17/383 137/73 |

(Continued)

FOREIGN PATENT DOCUMENTS

NL 2005704 C2 * 5/2012 ........... F16K 17/383

OTHER PUBLICATIONS

Translation of NL 2005704 (Year: 2010).*

(Continued)

*Primary Examiner* — Umashankar Venkatesan
(74) *Attorney, Agent, or Firm* — Carlson, Gaskey & Olds, P.C.

(57) ABSTRACT

A valve includes a valve body that defines a flow passage, a valve seat in the flow passage, a valve element that is initially in a closed position with respect to the valve seat to block flow through the flow passage, a bonding material that secures the valve element in the closed position, and at least one heater adjacent the valve seat and operable to heat the bonding material at least to a temperature at which the bonding material releases the valve element to move to an open position with respect to the valve seat to open flow through the flow passage.

16 Claims, 2 Drawing Sheets

(56) References Cited

U.S. PATENT DOCUMENTS

| | | | | |
|---|---|---|---|---|
| 2005/0173661 A1* | 8/2005 | Mignon | ................ | F16K 31/002 251/11 |
| 2005/0242311 A1* | 11/2005 | Willers | ................ | F16K 31/025 251/61 |
| 2016/0010758 A1* | 1/2016 | Nomichi | ............... | F16K 17/383 137/72 |
| 2016/0157669 A1* | 6/2016 | Andreis | ................ | A47J 31/461 222/129.1 |

OTHER PUBLICATIONS

Richard, J. (2014). SLM produced hermetically sealed isolation valve. Proceedings of the 42nd Aerospace Mechanisms Symposium. NASA Goddard Space Flight Center. May 14-16, 2014.

* cited by examiner

THERMALLY ACTIVATABLE VALVE

BACKGROUND

Pyrovalves are used in fluid feed systems of launch vehicles, rockets, spacecraft, space probes, and the like. Pyrovalves are one-time use valves that utilize an electric signal to ignite a pyrotechnic charge. The charge produces high pressure gases that open the valve (for a normally-closed configuration) or close the valve (for a normally-open configuration). Pyrovalves provide fast response time and low leak rate, but often require specially trained personnel for safe handling, access to the pyrovalve in the final assembly (thereby limiting design flexibility), and strict regulatory compliance.

SUMMARY

A valve according to an example of the present disclosure includes a valve body defining a flow passage, a valve seat in the flow passage, and a valve element that is initially in a closed position with respect to the valve seat to block flow through the flow passage. A bonding material secures the valve element in the closed position. At least one heater is adjacent the valve seat and operable to heat the bonding material at least to a temperature at which the bonding material releases the valve element to move to an open position with respect to the valve seat to open flow through the flow passage.

In a further embodiment of any of the foregoing embodiments, the bonding material is an alloy that includes tin and indium, and the temperature is a melting temperature of the alloy.

In a further embodiment of any of the foregoing embodiments, the bonding material is an alloy that has a composition of a first weight percentage of tin and a second weight percentage of indium, and the second weight percentage is greater than the first weight percentage.

In a further embodiment of any of the foregoing embodiments, the at least one heater circumscribes the valve seat.

In a further embodiment of any of the foregoing embodiments, the valve seat defines a valve seat plane, and the at least one heater is located on an exterior of the valve body such that the valve seat plane intersects the at least one heater.

In a further embodiment of any of the foregoing embodiments, the valve element carries the at least one heater.

In a further embodiment of any of the foregoing embodiments, the at least one heater includes a first heater on an exterior of the valve body and a second heater in an interior of the valve body.

In a further embodiment of any of the foregoing embodiments, the at least one heater includes first and second heaters on an exterior of the valve body.

A further embodiment of any of the foregoing embodiments includes a diamond-containing thermal-conduction element between the at least one heater and the valve seat.

A method according to an example of the present disclosure includes providing a valve that includes a valve body that defines a flow passage, a valve seat in the flow passage, a valve element that is initially in a closed position with respect to the valve seat to block flow through the flow passage, a bonding material that secures the valve element in the closed position, and at least one heater adjacent the valve seat. The at least one heater is activated to heat the bonding material at least to a temperature at which the bonding material releases the valve element to move to an open position with respect to the valve seat to open flow through the flow passage.

In a further embodiment of any of the foregoing embodiments, the bonding material is an alloy that includes tin and indium, and the temperature is a melting temperature of the alloy.

A further embodiment of any of the foregoing embodiments includes causing heat from the at least one heater to be conducted to the bonding material through a diamond-containing thermal-conduction element.

In a further embodiment of any of the foregoing embodiments, the at least one heater includes a first heater on an exterior of the valve body and a second heater in an interior of the valve body.

In a further embodiment of any of the foregoing embodiments, the activating includes activating only one of first heater or the second heater.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

Figure 1:
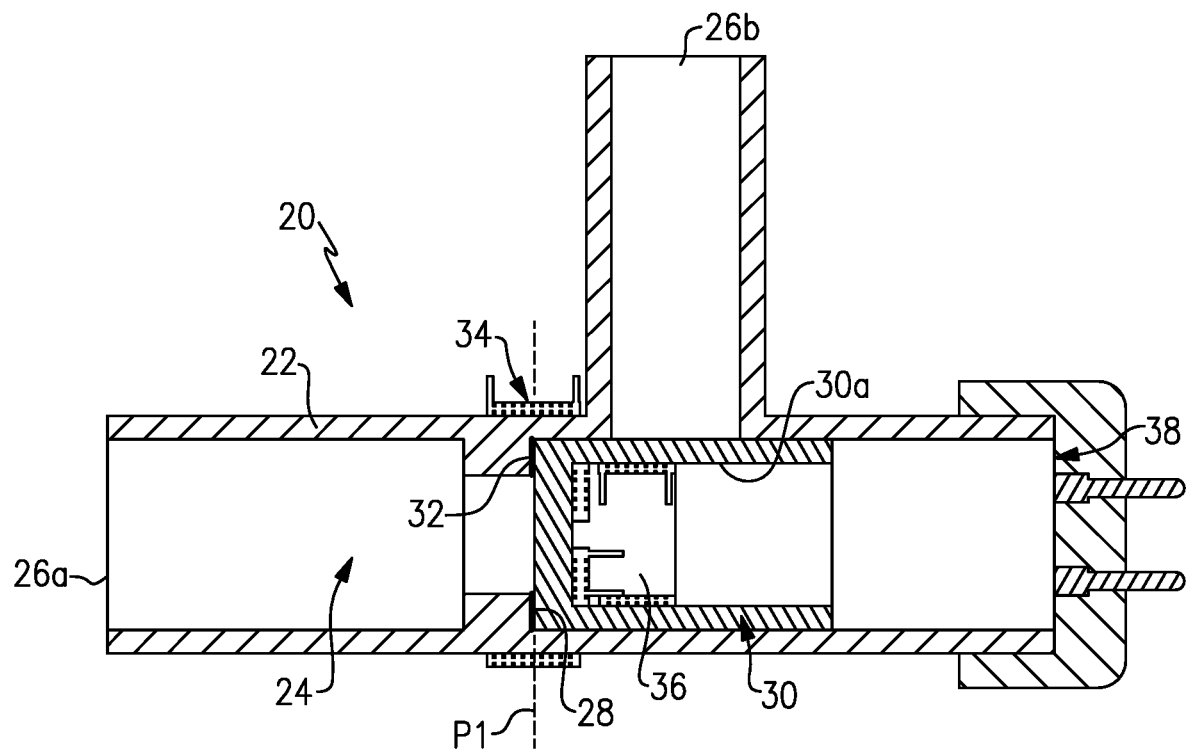
FIG. 1 illustrates an example of a valve in an initially closed position.

In this disclosure, like reference numerals designate like elements where appropriate and reference numerals with the addition of one-hundred or multiples thereof designate modified elements that are understood to incorporate the same features and benefits of the corresponding elements. Terms such as "first" and "second" used herein are to differentiate that there are two architecturally distinct components or features. Furthermore, the terms "first" and "second" are interchangeable in that a first component or feature could alternatively be termed as the second component or feature, and vice versa.

DETAILED DESCRIPTION

FIG. 1 illustrates a sectioned view of a thermally activatable valve 20. As will be appreciated, the valve 20 can be implemented in place of a pyrovalve in space vehicles, rockets, space probes, or other systems in which pyrovalves are used. As the valve 20 herein activates thermally and does not utilize pyrotechnic charges, it may also be considered to be a "pyroless" valve.

The valve 20 includes a valve body 22 that defines a flow passage 24 from an inlet 26a to an outlet 26b. For example, the valve body 22 is formed of a titanium alloy for light weight and high strength, although other alloys could be substituted as long as performance and durability requirements in the end use are met. The valve body 22 also defines a valve seat 28 in the flow passage 24, and there is a valve element 30 adjacent the valve seat 28. The valve seat 28 is a "seat" in the sense that it participates with the valve element 30 in sealing to block flow through the flow passage 24, though as described later below it does not contact the valve element 30. The valve element 30 is formed of an alloy, such as but not limited to, a copper-based alloy. If the valve 20 is to be used for a liquid, one or more seals (e.g., o-rings) may be provided around the valve element 30 to block leakage.

Figure 2:
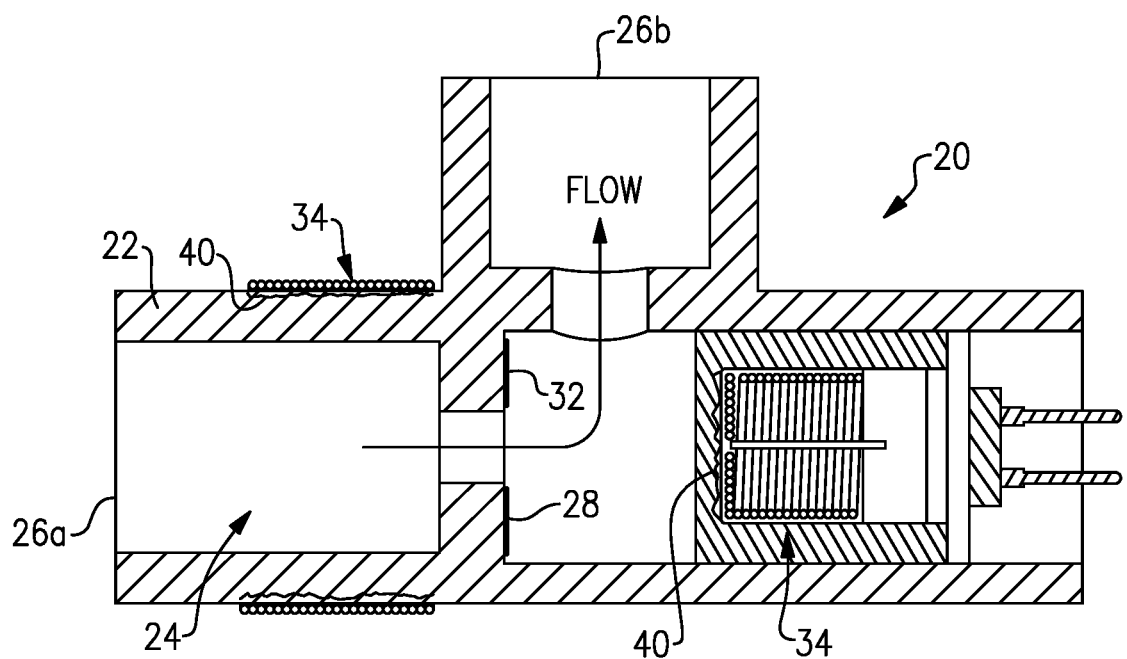
FIG. 2 illustrates the valve in an open position.

As shown, the valve element 30 is initially in a closed position (normally-closed) with respect to the valve seat 28, to block flow through the flow passage 24 from the inlet 26a to the outlet 26b. The "closed position" is an initial position of the valve element 30 in which flow through the flow passage 24 is fully or substantially fully blocked, while the "open position" is a position at which the valve element 30 is displaced from the closed position so as to allow flow through the flow passage 24. In the example shown, the valve element 30 is a piston that is translatable in the valve body 22 upon activation of the valve 20 to move to an open position (FIG. 2).

The valve 20 further includes a bonding material 32 that secures the valve element 30 to the valve seat 28 in the closed position. That is, the bonding material 32 "locks" the valve element 30 in place relative to the valve seat 28. In that regard, the bonding material 32 has a strength that is at least sufficient to retain the valve element 30 in the closed position against the pressure of the upstream fluid that the valve 20 is retaining. For instance, the bonding material 32 is in the form of a continuous layer that is metallurgically bonded to both the valve element 30 and the valve seat 28 (valve body 22). One or more plating layers may be used to enhance bonding, such as a nickel- and/or silver-plating.

The bonding material 32 also provides a seal between the valve element 30 and the valve seat 28 that substantially prevents fluid from flowing through the flow passage 24. As an example, the bonding material 32 is an alloy that includes tin and indium. For instance, the alloy has a composition of a first weight percentage of tin and a second weight percentage of indium, and the second weight percentage is greater than the first weight percentage. One useful composition includes, by total weight of the bonding material 32, approximately 52% indium and approximately 48% tin. Indium, in comparison to tin, has a low melting point (118° C.). The ratio of In Sn determines the melting point of the bonding material 32, and the ratio can thus be selected to achieve a desired melting point for the bonding material 32. If higher temperature is desired, another type of solder material may be used. Additionally, if higher strength bonding is desired, the surface area that the bond material 32 covers can be increased.

There is at least one heater 34 situated adjacent the valve seat 28. As used herein, the "heater" refer to a heating element rather than electronics or other components that may be used with a heating element. The heater 34 is operable to heat the bonding material 32 at least to a temperature at which the bonding material 32 releases the valve element 30. In that regard, the heater 34 is in communication with one or more processors that are configured to activate the heater 34 in response to a downstream demand for the fluid. Once released, under the upstream pressure of the fluid, the valve element 30 moves to an open position and thus permits flow through the flow passage 24.

The alloy of the bonding material 32 has a relatively low melting temperature (in comparison to the alloys of the valve body 22 and of the valve element 30). The heater 34, when activated, rapidly increases the temperature of the bonding material 32 in order to release the valve element 30. The temperature to which the bonding material is heated for release is either its melting temperature or a temperature near its melting temperature at which the bonding material 32 softens and loses strength to secure the valve element 30.

The composition of the bonding material 32 can be modified to change the In:Sn ratio and/or to include other elements in order to tailor the melting temperature to a desired level. Once softened and melted, the bonding material 32 loses strength and the ability to secure the valve element 30 against the head pressure of the upstream fluid that the valve 20 blocks. The pressure thus moves the valve element 30 to the open position, shown in FIG. 2, in which fluid is permitted through the flow path 24 to the outlet 26b.

In the illustrated example, the heater 34 is a heating coil, such as a nichrome resistance heating wire, that circumscribes the valve body 22 at the location of the valve seat 28. For instance, the valve seat 28 defines a valve seat plane P1, and the heater 34 is located on an exterior of the valve body 22 such that the valve seat plane P1 intersects the heater 34. For example, the plane P1 is the plane in which the axial face of the valve seat 28 lies. That is, the heater 34 is directly outwards of the valve seat 28, to minimize the heat transfer distance from the heater 34 to the bonding material 32. Other types of heaters, such as but not limited to, toroidal heaters or patterned coils can alternatively be used to circumscribe the valve seat 28. The surrounding of the valve seat 28 enables the heater 34 to uniformly heat the bonding material 32 around the entire circumference of the valve seat 28 and thus provide even release of the valve element 30.

Figure 3:
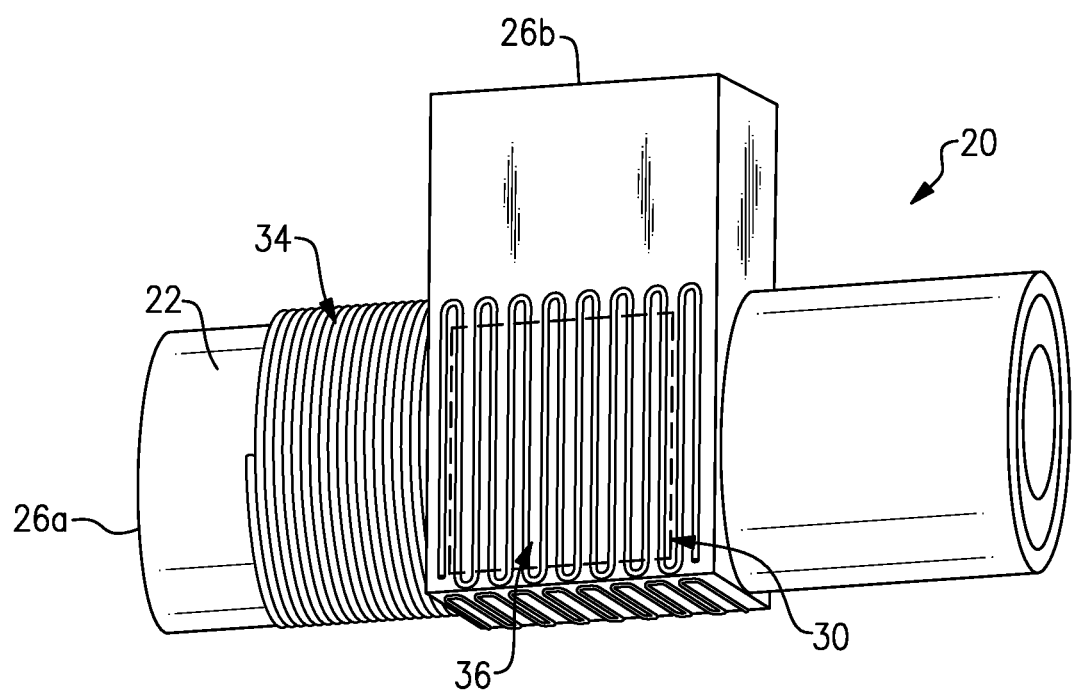
FIG. 3 illustrates the valve with two heaters on the exterior of the valve body.

In the example shown, the valve 20 also includes a second heater 36 that is carried on the valve element 30. For instance, the valve element 30 is hollow and defines an internal cavity 30a in which the second heater 36 is situated. The second heater 36 may include an electrical connection through a plug or port 38 provided behind the valve element 30. Thus, the valve 20 includes one heater 34 located on an exterior of the valve body 22 and another heater 36 located in an interior of the valve body 22. The heaters 34/36 may be operated in cooperation to concurrently heat the bonding material 32, or one of the heaters 34/36 may be used as a "redundant" heater in the event that the other heater becomes inoperable. In one further example shown in FIG. 3, rather than being carried in the valve element 30, the second heater 36, like the first heater 34, is also situated on the exterior of the valve body 22 but is immediately outwards of the valve element 30.

In a further example, in order to facilitate rapid heating of the bonding material 32, the valve 20 additionally includes a diamond-containing thermal-conduction element 40 between the heater 34 and/or 36 and the valve seat 28. Diamond has excellent thermal conductance and thus facilitates rapid heat transfer from the heaters 34/36 to the bonding material 32. For instance, the diamond-containing thermal-conduction element 40 is a layer that includes diamond particles dispersed in a matrix, such as a cermet or a polymer (e.g., epoxy) matrix.

The valve 20 permits initiation without use of pyrotechnic charges, thereby eliminating the need for special handling, eliminating the need for access to the valve in the final assembly, and eliminating the need for pyrotechnic regulatory compliances. Moreover, the heater 34/36 rapidly increases the temperature of the bonding material 32, permitting fast response times that are expected to be comparable to that of pyrovalves.

A related method involving use of the valve 20 includes providing the valve 20, as discussed above. The provision of the valve 20 can include furnishing of the valve 20 as a pre-manufactured component in a fluid feed system or manufacturing the valve 20 from its sub-components to provide into a fluid system. Once in the system, the method further involves activating the heater 34 and/or 36 to heat the bonding material 32 at least to a temperature at which the bonding material 32 releases the valve element 30 to move to an open position with respect to the valve seat 28 and thereby open flow through the flow passage 24. Rapid response time of the valve 20 can be facilitated by causing heat from the heater 34 and/or 36 to be conducted to the bonding material 32 through the diamond-containing thermal-conduction element 40. In a further example, one of the heaters 34 or 36 is a "primary" heater and the other of the heaters 36 or 34 is a "secondary" (redundant) heater in the event that the primary heater becomes inoperable. In this regard, one example activation of the valve 20 includes activating only one of the heaters 34 or 36 at a time.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A valve comprising:
   a valve body defining a flow passage;
   a valve seat in the flow passage;
   a valve element that is initially in a closed position with respect to the valve seat to block flow through the flow passage;
   a bonding material metallurgically bonded with the valve element and the valve seat and thereby securing the valve element in the closed position; and
   at least one heater adjacent the valve seat and operable to heat the bonding material at least to a temperature at which the bonding material releases the valve element to move to an open position with respect to the valve seat to open flow through the flow passage.

2. The valve as recited in claim 1, wherein the bonding material is an alloy that includes tin and indium, and the temperature is a melting temperature of the alloy.

3. The valve as recited in claim 1, wherein the bonding material is an alloy that has a composition of a first weight percentage of tin and a second weight percentage of indium, and the second weight percentage is greater than the first weight percentage.

4. The valve as recited in claim 1, wherein the at least one heater circumscribes the valve seat.

5. The valve as recited in claim 1, wherein the valve seat defines a valve seat plane, and the at least one heater is located on an exterior of the valve body such that the valve seat plane intersects the at least one heater.

6. The valve as recited in claim 1, wherein the valve element carries the at least one heater.

7. The valve as recited in claim 1, wherein the at least one heater includes a first heater on an exterior of the valve body and a second heater in an interior of the valve body.

8. The valve as recited in claim 1, wherein the at least one heater includes first and second heaters on an exterior of the valve body.

9. The valve as recited in claim 1, further comprising a diamond-containing thermal-conduction element between the at least one heater and the valve seat.

10. A method comprising:
    providing a valve that includes a valve body that defines a flow passage, a valve seat in the flow passage, a valve element that is initially in a closed position with respect to the valve seat to block flow through the flow passage, a bonding material that secures the valve element in the closed position, and at least one heater adjacent the valve seat, the at least one heater includes a first heater on an exterior of the valve body and a second heater in an interior of the valve body; and
    activating the at least one heater to heat the bonding material at least to a temperature at which the bonding material releases the valve element to move to an open position with respect to the valve seat to open flow through the flow passage.

11. The method as recited in claim 10, wherein the bonding material is an alloy that includes tin and indium, and the temperature is a melting temperature of the alloy.

12. The method as recited in claim 10, further comprising causing heat from the at least one heater to be conducted to the bonding material through a diamond-containing thermal-conduction element.

13. The method as recited in claim 10, wherein the activating includes activating only one of first heater or the second heater.

14. A valve comprising:
    a valve body defining a flow passage;
    a valve seat in the flow passage;
    a valve element that is initially in a closed position with respect to the valve seat to block flow through the flow passage;
    a bonding material securing the valve element in the closed position; and
    at least one heater adjacent the valve seat and carried by the valve element, the at least one heater operable to heat the bonding material at least to a temperature at which the bonding material releases the valve element to move to an open position with respect to the valve seat to open flow through the flow passage.

15. The valve as recited in claim 1, wherein the temperature is a melting temperature of the bonding material.

16. The valve as recited in claim 1, wherein the temperature is near a melting temperature of the bonding material at which the bonding material softens and loses strength to secure the valve element in the closed position.

* * * * *